(12) United States Patent
Rhim et al.

(10) Patent No.: US 10,754,469 B2
(45) Date of Patent: Aug. 25, 2020

(54) TOUCH DETECTION METHOD AND TOUCH DETECTION APPARATUS

(71) Applicant: MELFAS INC., Seongnam-si, Gyeonggi-do (KR)

(72) Inventors: Byung Sang Rhim, Yongin-si (KR); Jae Woo You, Seongnam-si (KR); Min Suk Woo, Seoul (KR)

(73) Assignee: MELFAS INC., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 16/327,503

(22) PCT Filed: Jul. 4, 2017

(86) PCT No.: PCT/KR2017/007053
§ 371 (c)(1),
(2) Date: Feb. 22, 2019

(87) PCT Pub. No.: WO2018/043902
PCT Pub. Date: Mar. 8, 2018

(65) Prior Publication Data
US 2019/0354225 A1    Nov. 21, 2019

(30) Foreign Application Priority Data

Aug. 31, 2016 (KR) .......................... 10-2016-0111415

(51) Int. Cl.
*G06F 3/045* (2006.01)
*G06F 3/041* (2006.01)
*G06F 3/044* (2006.01)

(52) U.S. Cl.
CPC .......... *G06F 3/0416* (2013.01); *G06F 3/0443* (2019.05)

(58) Field of Classification Search
CPC ....... G06F 3/0416; G06F 3/044; G06F 3/0412
See application file for complete search history.

(56) References Cited

U.S. PATENT DOCUMENTS

| 2008/0111714 A1* | 5/2008 | Kremin | .................. G06F 3/044 |
| | | | 341/33 |
| 2008/0309628 A1* | 12/2008 | Krah | ..................... G06F 3/0412 |
| | | | 345/173 |
| 2014/0104223 A1* | 4/2014 | Hanssen | ................. G06F 3/044 |
| | | | 345/174 |

FOREIGN PATENT DOCUMENTS

| JP | 2002-014756 A | 1/2002 |
| KR | 10-2011-0037579 A | 4/2011 |

(Continued)

OTHER PUBLICATIONS

International Search Report for PCT/KR2017/007053 dated Oct. 19, 2017 from Korean Intellectual Property Office.

(Continued)

*Primary Examiner* — Nan-Ying Yang
(74) *Attorney, Agent, or Firm* — Paratus Law Group, PLLC

(57) ABSTRACT

An apparatus for detecting a touch includes a touch panel configured to include an electrode constituting a self-capacitor together with an object, a charge-sharing unit configured to include a charge-sharing capacitor which is charge-shared with the self-capacitor, a differential signal generation unit configured to receive an output signal of the charge-sharing unit, generate a pair of pseudo differential touch signals, and detect a touch of the object, and a control unit configured to control the charge-sharing unit so that the charge-sharing unit may perform charge sharing and signal output.

11 Claims, 9 Drawing Sheets

(56) References Cited

FOREIGN PATENT DOCUMENTS

| KR | 10-2011-0134886 A | 12/2011 |
| KR | 10-2012-0105445 A | 9/2012 |
| KR | 10-1564069 B1 | 10/2015 |

OTHER PUBLICATIONS

Korean Office Action for related KR Application No. 10-2016-0111415 dated Apr. 17, 2017 from Korean Intellectual Property Office.
Korean Notice of Allowance for related KR Application No. 10-2016-0111415 dated Dec. 28, 2017 from Korean Intellectual Property Office.

* cited by examiner

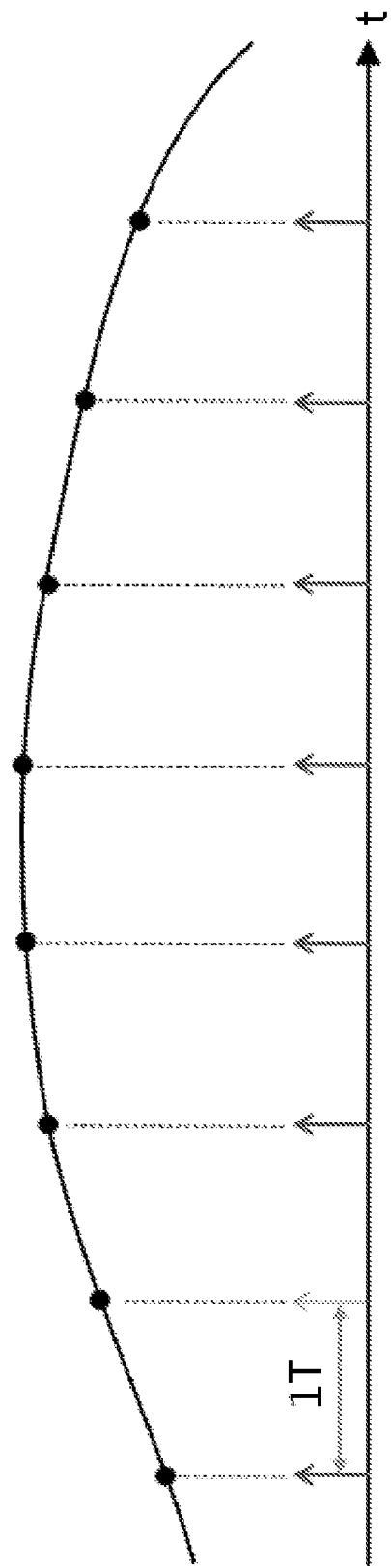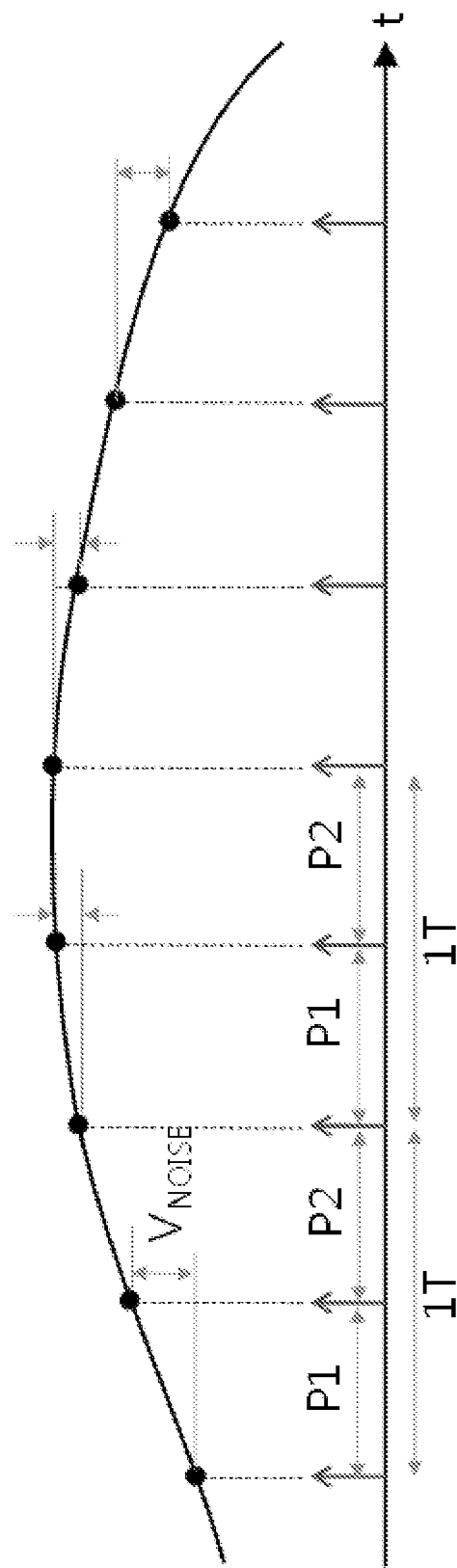

TOUCH DETECTION METHOD AND TOUCH DETECTION APPARATUS

CROSS REFERENCE TO PRIOR APPLICATIONS

This application is a National Stage Patent Application of PCT International Patent Application No. PCT/KR2017/007053 (filed on Jul. 4, 2017) under 35 U.S.C. § 371, which claims priority to Korean Patent Application No. 10-2016-0111415 (filed on Aug. 31, 2016), which are all hereby incorporated by reference in their entirety.

BACKGROUND

The present invention relates to a touch detection method and a touch detection apparatus using the same.

Sensing methods which are currently being used in touch screens are mostly resistive, surface acoustic wave, and capacitive types. Since the capacitive sensing method makes it possible to sense multiple touches, exhibits excellent durability, visibility, etc., there is a trend toward adopting the capacitive sensing method as a main input means for portable mobile devices.

A capacitive touch screen recognizes a user input by sensing a change in the quantity of electric charge in capacitive sensors on a touch screen panel caused by a user intervention. Capacitive touch sensors are classified into a self-capacitive type and a mutual-capacitive type according to charge accumulation methods. In a self-capacitance touch screen, each capacitive sensor constitutes one conductor and forms a charged surface together with a reference ground outside the touch screen panel, but in a mutual-capacitance touch screen, two conductors on the touch screen panel are configured to mutually form charged surfaces and function as one capacitive sensor.

A general self-capacitance touch screen employs an X/Y orthogonal arrangement of conductors. In this case, each capacitive sensor functions as a line sensor, and thus only one piece of X-sensing information and one piece of Y-sensing information are respectively provided by an X-line sensor group and a Y-line sensor group every time the touch screen is scanned. Therefore, the general self-capacitance touch screen can sense and track a single touch but cannot support multiple touches. A mutual-capacitance touch screen also employs an X/Y orthogonal arrangement of conductors. However, the mutual-capacitance touch screen differs from the self-capacitance touch sensor in that capacitive sensors are each placed at intersections of conductors in the form of grid sensors, and responses of all grid sensors are independently sensed when a user input on the touch screen is detected. Since grid sensors each correspond to different X/Y coordinates and provide independent responses, the mutual-capacitance touch sensor can sense and track multiple touches of a user by extracting user input information from a set of X/Y sensing information provided by a set of X/Y grid sensors.

SUMMARY

A signal output from a touch panel corresponds to a single ended signal scheme in which information is transferred through a change in a level with respect to a reference voltage. The single ended signal scheme is a simple signal transmission scheme but is weak in terms of removing introduced noise and preventing introduction of noise.

Due to a trend toward reduction in size and thickness of electronic devices, noise introduced in a touch panel is gradually increasing, and low-band noise which cannot be removed by a filter, such as charger noise, is also increasing. Charger noise has influence on a sensor which detects a touch by an object. Therefore, when a signal output from a touch panel is processed in the existing single ended signal scheme, signal-to-noise ratio performance is degraded, and it may be difficult to detect whether a touch has been made, touch coordinates, etc. using a touch signal.

To solve the foregoing problems of conventional art, the present invention is mainly directed to readily removing noise from a signal introduced into a touch panel and readily detecting information, such as whether a touch has been made and touch coordinates.

One aspect of the present invention provides a method of generating pseudo differential touch signals, the method including (a) generating a first touch signal corresponding to a touch input, (b) maintaining the generated first touch signal, and (c) generating a second touch signal corresponding to the touch input. The first touch signal and the second touch signal are in a pseudo differential relationship.

Another aspect of the present invention provides a method of detecting a touch, the method including (a) generating a first touch signal corresponding to a touch input, (b) maintaining the generated first touch signal, and (c) generating a second touch signal corresponding to the touch input. The first touch signal and the second touch signal are in a pseudo differential relationship.

Another aspect of the present invention provides an apparatus for detecting a touch, the apparatus including: a touch panel configured to include an electrode constituting a self-capacitor together with an object; a charge-sharing unit configured to include a charge-sharing capacitor which is charge-shared with the self-capacitor; a differential signal generation unit configured to receive an output signal of the charge-sharing unit, generate a pair of pseudo differential touch signals, and detect a touch of the object; and a control unit configured to control the charge-sharing unit so that the charge-sharing unit may perform charge sharing and signal output.

According to an exemplary embodiment of the present invention, it is possible to reduce influence of low-band noise.

BRIEF DESCRIPTION OF THE DRAWINGS

FIG. 9A is a diagram showing an overview of values detected by an apparatus for detecting a touch according to conventional art, and FIG. 9B is a diagram showing an overview of values detected by an apparatus for detecting a touch according to the conventional art.

DETAILED DESCRIPTION

Figure 1:
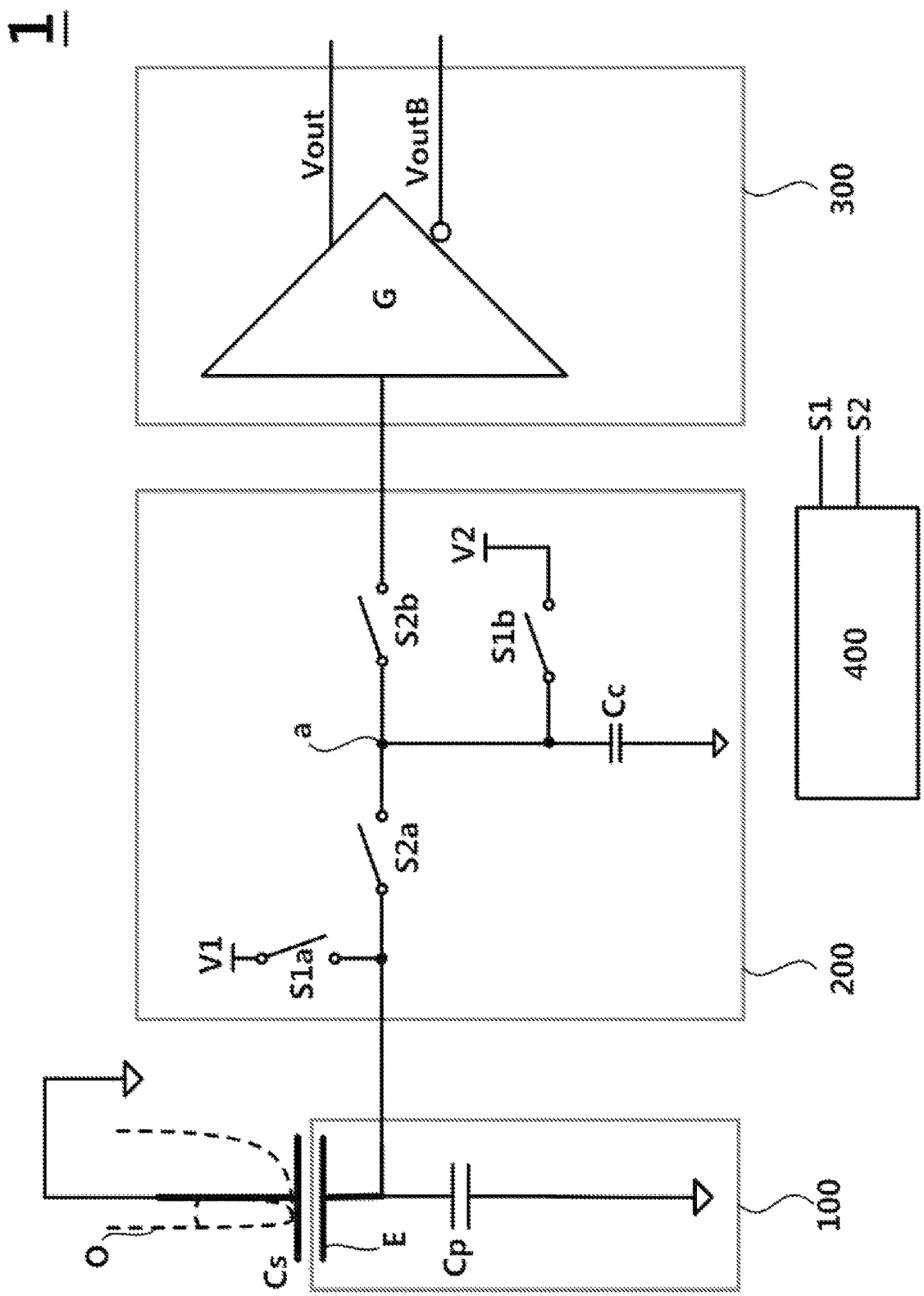
FIG. 1 is a schematic diagram showing an overview of an apparatus for detecting a touch according to an exemplary embodiment of the present invention.

The following detailed structural or functional description of the present invention is provided as an example only, and the scope of the present invention should not be construed as being limited to the embodiments set forth herein. In other words, since the embodiments may be modified in various ways and have various forms, the scope of the present invention should be understood to include equivalents for implementing the technical spirit of the invention.

Meanwhile, terminology used herein should be understood as follows.

Terms, such as "first" and "second," are intended to distinguish one element from another element, and the scope of the present invention should not be limited by the terms. For example, a first element may be referred to as a second element, and similarly the second element may also be referred to as the first element.

When it is mentioned that a certain element is "above" or "on" another element, it should be understood that the certain element may be directly on the other element or another component may be interposed therebetween. On the contrary, when it is mentioned that a certain element is "in touch with" another element, it should be understood that there is no element therebetween. Meanwhile, other expressions for describing the positional relationship between elements, that is, "between," "directly between" "adjacent to," "directly adjacent to," or the like, should be interpreted in the same manner as above.

A singular expression includes a plural expression unless the context clearly indicates otherwise. The term "include," "have," or the like should be understood to indicate the presence of specified characteristics, figures, steps, operations, elements, parts, or combinations thereof and not to preclude the presence of addition of one or more characteristics, figures, steps, operations, elements, parts, or combinations thereof.

Respective steps may be performed in a sequence different from a described sequence unless a specific sequence is clearly described in the context. In other words, steps may be performed in a described sequence, substantially concurrently, or in the reverse sequence.

In the drawings referred so as to describe exemplary embodiments of the present disclosure, the sizes, heights, and thicknesses of elements are intentionally exaggerated for convenience of description and easy understanding and are not enlarged or reduced according to a ratio. Also, an element in the drawings may be intentionally reduced, and another element in the drawings may be intentionally enlarged.

Unless otherwise defined, all terms used herein have the same meaning as commonly understood by those or ordinary skill in the art to which the present invention pertains. Terms, such as those defined in commonly used dictionaries, should be interpreted as having a meaning that is consistent with their meaning in the context of the relevant art, and are not to be interpreted in an idealized or overly formal sense unless expressly so defined herein.

In this specification, an entity with which a user can make an input is defined as "object." Such an object indicates an entity, such as a hand, a palm, or a stylus, which may make a touch input by touching a touch panel 100 or hovering over the touch panel 100. However, this is intended to describe an object rather than limiting the scope of an object. A cheek, toe, etc., which may form a self-capacitance together with an electrode by hovering over a touch panel, may also be objects.

Figure 2:
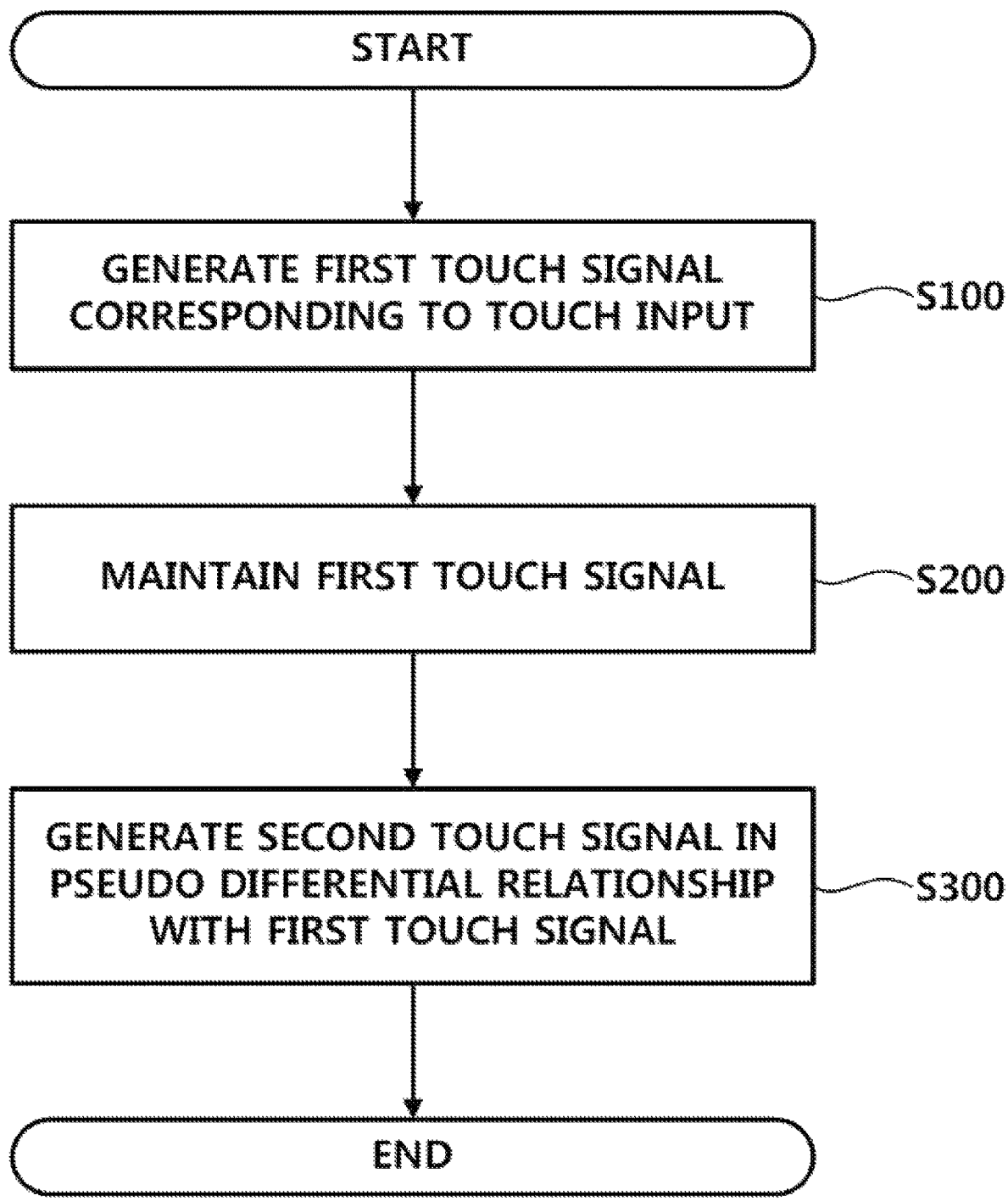
FIG. 2 is a flowchart showing an overview of a method of detecting a touch according to an exemplary embodiment of the present invention.

Hereinafter, exemplary embodiments of the present invention will be described with reference to the accompanying drawings. FIG. 1 is a schematic diagram showing an overview of an apparatus 1 for detecting a touch according to an exemplary embodiment of the present invention. FIG. 2 is a flowchart showing an overview of a method of detecting a touch according to an exemplary embodiment of the present invention. Referring to FIGS. 1 and 2, the apparatus 1 for detecting a touch according to an exemplary embodiment of the present invention includes a touch panel 100 including an electrode E which constitutes a self-capacitor Cs together with an object O, a charge-sharing unit 200 including a charge-sharing capacitor Cc which is charge-shared with the self-capacitor Cs, a differential signal generation unit 300 receiving an output signal of the charge-sharing unit 200 and generating a pair of pseudo differential touch signals, and a control unit 400 controlling the charge-sharing unit to perform charge sharing and signal output.

The method of detecting a touch according to an exemplary embodiment of the present invention includes (a) generating a first touch signal corresponding to a touch input (S100), (b) maintaining the generated first touch signal (S200), and (c) generating a second touch signal corresponding to the touch input (S300). The first touch signal and the second touch signal are in a pseudo differential relationship.

Referring to FIG. 1, the touch panel 100 includes at least one electrode E. The electrode E functions as one electrode of the self-capacitor Cs, and the object O functions as the other electrode of the self-capacitor Cs.

In the actual touch panel 100, there are several parasitic capacitances such as a parasitic capacitance formed between the electrodes and the ground potential and a parasitic capacitance formed between adjacent electrodes. Hereinafter, a parasitic capacitance Cp indicates and used as an equivalent parasitic capacitance including all parasitic capacitances formed with the electrode E which forms the self-capacitance Cs together with the object O.

In the self-capacitor Cs, the electrode E of the touch panel 100 constitutes one electrode of the self-capacitor Cs, and the object O constitutes the other electrode of the self-capacitor Cs. Since the object O is electrically connected to the ground potential, the self-capacitor Cs is connected in parallel with the parasitic capacitor Cp. An equivalent capacitance shown in the charge-sharing unit 200 is the capacitance of Cp+Cs formed by connecting the self-capacitance Cs and the parasitic capacitance Cp in parallel with each other.

$$C = \varepsilon \frac{A}{d} \quad \text{[Equation 1]}$$

(C: capacitance, A: the area of an electrode, and d: the distance between electrodes)

Referring to Equation 1 for calculating the capacitance of a capacitor, it is possible to see that the capacitance value of the self-capacitor varies according to the distance d between the object O and the electrode E. When the capacitance value of the self-capacitor is a predetermined value or more, it is possible to consider that the object O provides a touch input by touching the touch panel 100.

The charge-sharing unit 200 includes switches S1a, S1b, S2a, and S2b which are controlled to precharge a charge-sharing capacitor Cc, the self-capacitor Cs, and the parasitic capacitor Cp to a predetermined voltage and to perform charge sharing, and the charge-sharing capacitor Cc which performs charge sharing with the self-capacitor Cs. The plurality of switches S1a, S1b, S2a, and S2b are controlled to be turned on or off by control signals S1 and S2 provided by the control unit.

The voltage values of a first voltage V1 for precharging the self-capacitor Cs and the parasitic capacitor Cp and a second voltage V2 for precharging the charge-sharing capacitor Cc are controlled by the control unit 400. As an example, in a first precharge phase P1 (see FIG. 4), the control unit 400 provides a driving voltage Vdd as the first voltage V1 and provides a ground voltage Vgnd as the second voltage. In a second precharge phase P2 (see FIG. 4), the control unit 400 provides the ground voltage Vgnd as the first voltage V1 and provides the driving voltage Vdd as the second voltage.

Figure 3:
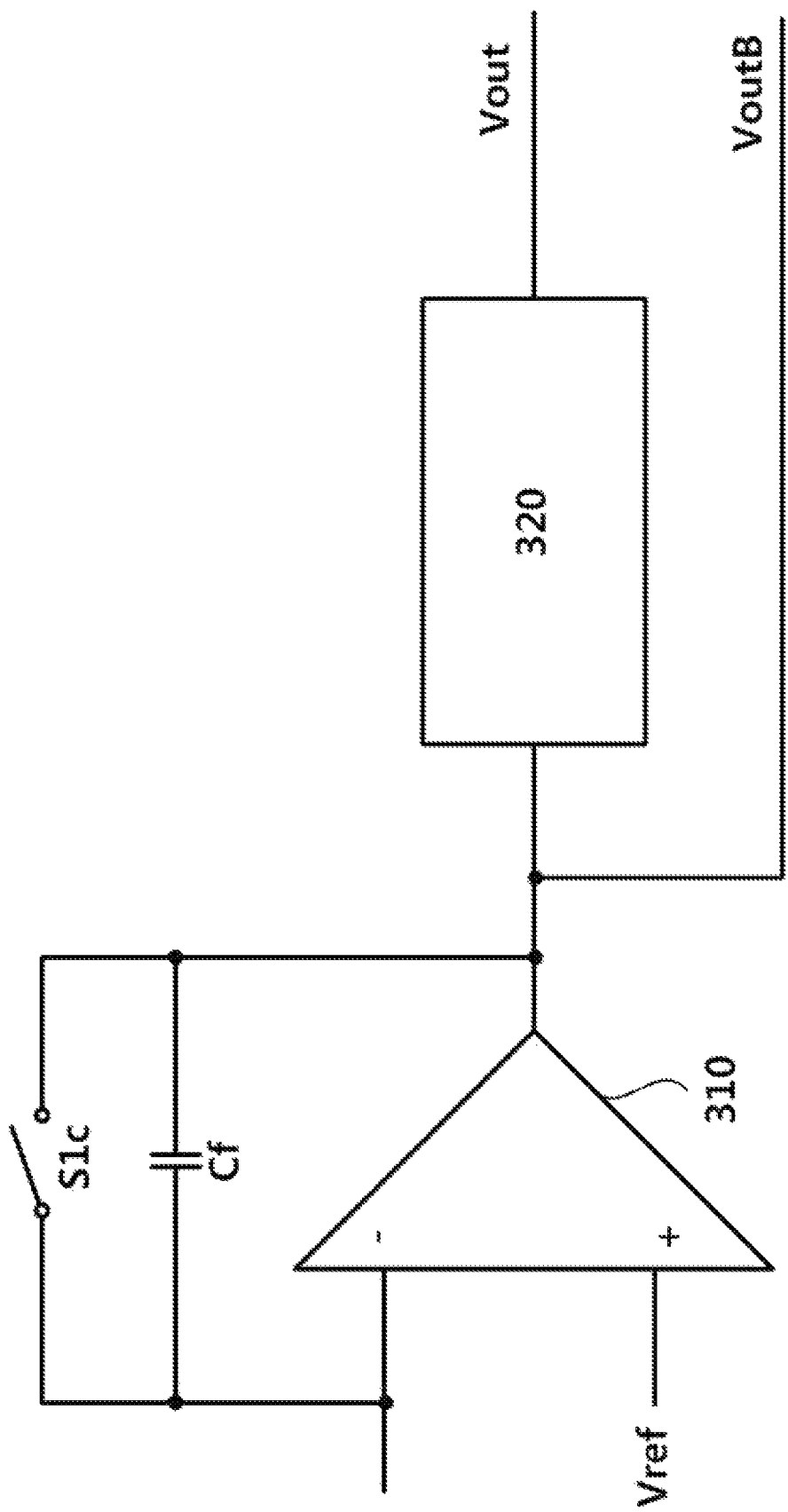
FIG. 3 is a block diagram showing an overview of a differential signal generation unit.

FIG. 3 is a block diagram showing an overview of the differential signal generation unit 300. Referring to FIG. 3, according to an exemplary embodiment of the present invention, the differential signal generation unit 300 includes a charge amplifier 310 which integrates a signal provided by the charge-sharing unit 200 and outputs the integrated signal and a delay unit 320 which delays and outputs the output signal of the charge amplifier 310. The charge-sharing unit 200 provides a signal generated by performing first charge sharing to the charge amplifier 310, and the charge amplifier 310 accumulates the provided signal and outputs the accumulated signal.

The delay unit 320 maintains and outputs the signal provided by the charge amplifier 310 when the charge amplifier 310 outputs a second touch signal VoutB generated by second charge sharing. Vout, which is a value maintained and output by the charge-sharing unit 200, and VoutB, which is a result value of second charge sharing and integration by the charge-sharing unit 200, are voltages complementary to each other and have charge-shared values. Since a first charge-sharing process for generating Vout and a second charge-sharing process for generating VoutB are performed at a time interval, the signals Vout and VoutB output by the differential signal generation unit 300 are pseudo differential signals.

In an exemplary embodiment of the present invention, the differential signal generation unit 300 may further include an amplifier (not shown), and the apparatus 1 for detecting a touch according to the exemplary embodiment may further include an analog-to-digital converter (ADC) (not shown) which receives and converts the pair of output signals Vout and VoutB of the differential signal generation unit 300 into digital signals.

The control unit 400 controls switches included in the charge-sharing unit 200 and the differential signal generation unit 300. According to an exemplary embodiment of the present invention, the switches S1a and S1b included in the charge-sharing unit 200 and a switch S1c included in the differential signal generation unit 300 are controlled to be turned on or off by the control signal S1 provided by the control unit 400. Also, the switches S2a and S2b included in the charge-sharing unit 200 are controlled to be turned on or off by the control signal S2 provided by the control unit 400. As an example, the control signals S1 and S2 may be complementary to each other. Also, the control unit 400 controls voltages provided as the first voltage V1 (see FIG. 1) and the second voltage V2 (see FIG. 1) in the first charge-sharing phase P1 and the second charge-sharing phase P2.

Figure 4:
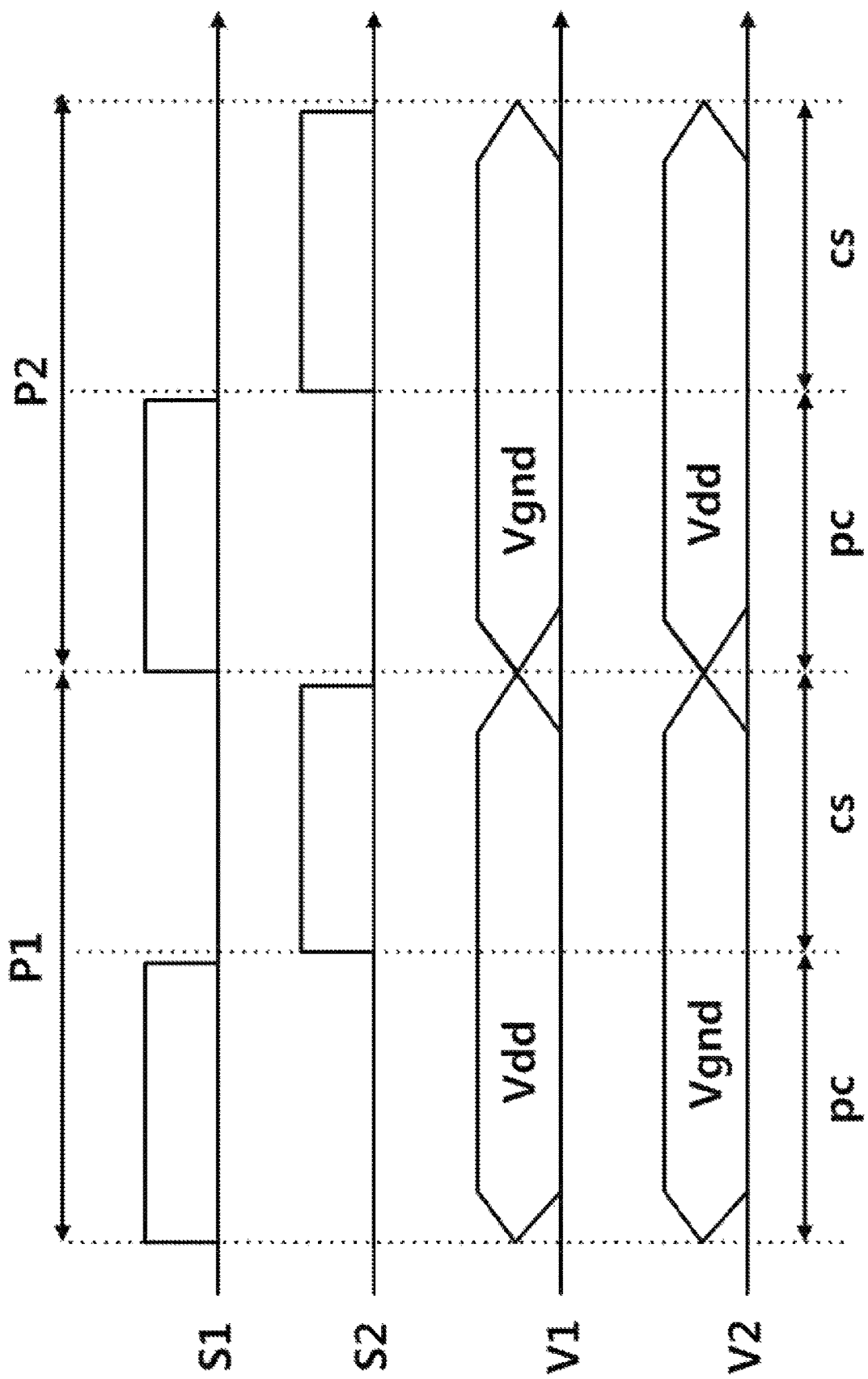
FIG. 4 is a timing diagram showing an overview of signals provided to the apparatus for detecting a touch according to an exemplary embodiment of the present invention.

FIG. 4 is a timing diagram showing an overview of signals provided to the apparatus for detecting a touch according to an exemplary embodiment of the present invention. Referring to FIG. 4, both the first charge-sharing phase P1 and the second charge-sharing phase P2 include a precharge step pc and a charge-sharing step cs. As shown in the drawing, the control signals S1 and S2 provided in the precharge step pc and the charge-sharing step cs do not have turn-on periods which overlap each other to prevent periods in which switches are turned on from overlapping each other.

FIG. 4 shows that the first charge-sharing phase P1 and the second charge-sharing phase P2 are consecutive. However, this is only one embodiment, and another process may be interposed between the first charge-sharing phase P1 and the second charge-sharing phase P2. Also, this embodiment shows that all the switches are embodied into N-channel metal-oxide semiconductor (NMOS) switches which are turned on when a logic-high signal is provided. However, this is only an implementation example, and those of ordinary skill in the art may embody the switches not only into P-channel metal-oxide semiconductor (PMOS) switches, which are turned on when a logic-low signal is provided, but also into other types of semiconductor switches.

The exemplary embodiment shown in FIG. 4 shows that, in the precharge step pc and the charge-sharing step cs of the first charge-sharing phase P1, the first voltage V1 and the second voltage V2 are respectively maintained at Vdd and Vgnd, and in the precharge step pc and the charge-sharing step cs of the second charge-sharing phase P2, the first voltage V1 and the second voltage V2 are respectively maintained at Vgnd and Vdd. According to an exemplary embodiment not shown in the drawings, the first voltage V1 and the second voltage V2 may be respectively maintained at Vdd and Vgnd in the precharge step pc of the first charge-sharing phase P1 and may be respectively maintained at Vgnd and Vdd in the precharge step pc of the second charge-sharing phase P2.

Figure 5:
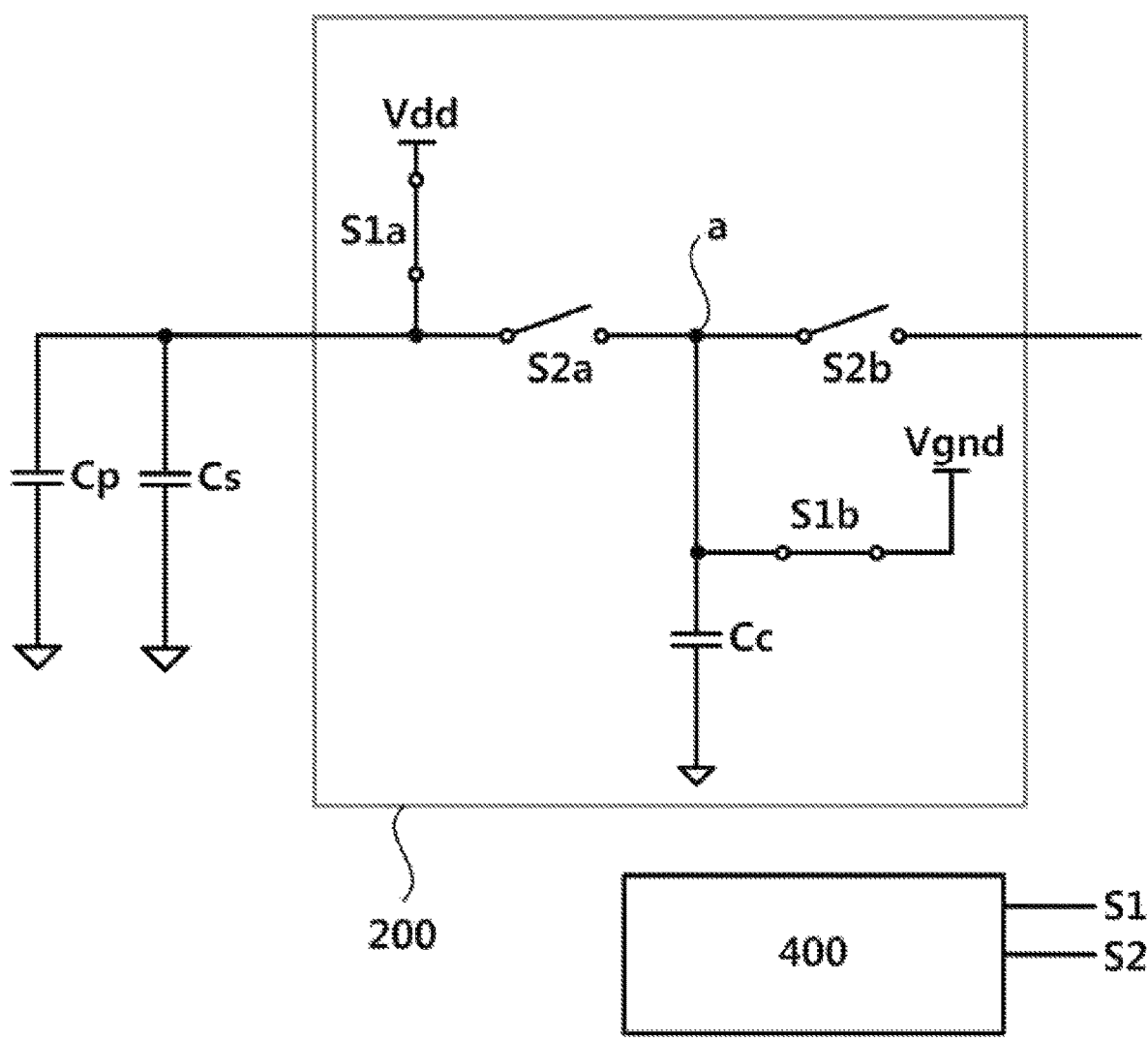
FIG. 5 is an equivalent circuit diagram in a precharge process of a first charge-sharing phase.

FIG. 5 is an equivalent circuit diagram in the precharge process pc of the first charge-sharing phase P1. Referring to FIGS. 1 to 5, a first touch signal corresponding to a touch input of the object O is generated in the first charge-sharing phase P1 (S100). The control unit 400 provides the driving voltage Vdd as the first voltage V1 and provides the ground voltage Vgnd as the second voltage V2. The control unit 400 turns on the switches S1a and S1b by providing the signal S1 of a logic-high state to precharge the self-capacitor Cs and the parasitic capacitor Cp to the driving voltage Vdd and precharge the charge-sharing capacitor Cc to the ground voltage Vgnd.

The switch S1c of the differential signal generation unit 300 is turned on by receiving the signal S1 of the logic-high state and resets a feedback capacitor Cf by flushing charge stored in the feedback capacitor Cf.

Figure 6:
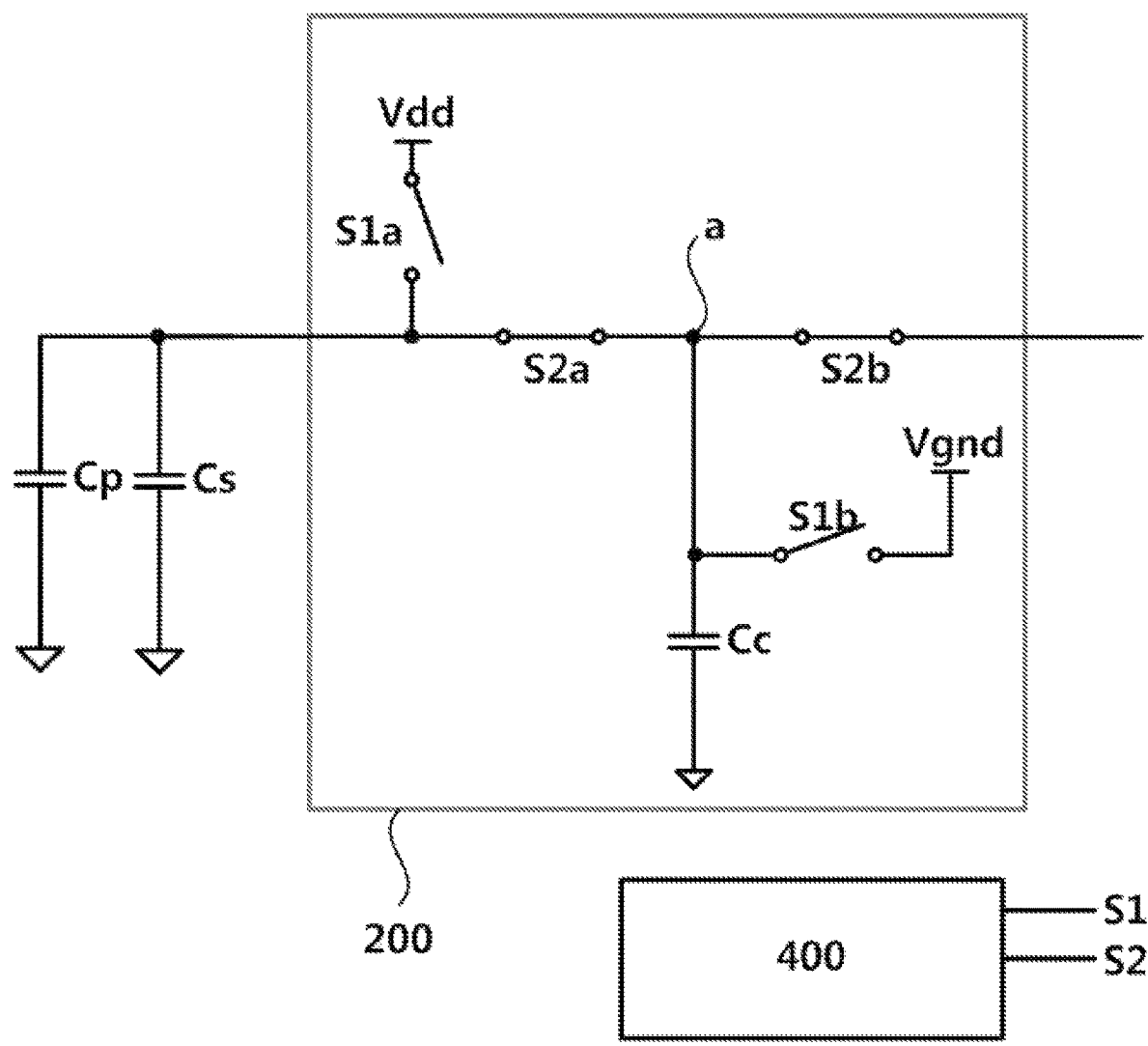
FIG. 6 is an equivalent circuit diagram in a charge-sharing process of the first charge-sharing phase.

FIG. 6 is an equivalent circuit diagram in the charge-sharing process pc of the first charge-sharing phase P1. Referring to FIG. 6, the control unit 400 electrically connect the self-capacitor Cs and the parasitic capacitor Cp precharged to the driving voltage Vdd to the charge-sharing capacitor Cc precharged to the ground voltage Vgnd by turning on the switch S2a. As the charge-sharing capacitor Cc is electrically connected to the self-capacitor Cs and the parasitic capacitor Cp, charge sharing is performed, and a voltage Va1 of a node a obtained at this time is calculated as shown in the following equation.

$$Va1 = \frac{Vdd \times (Cs + Cp)}{(Cs + Cp + Cc)} \quad \text{[Equation 2]}$$

The charge amplifier 310 receives the output voltage Va1 of the charge-sharing unit 200 and generates a touch signal by integrating the output voltage Va1 for a predetermined time period. The charge amplifier 310 performs integration on the basis of a reference voltage Vref. The control unit 40 provides the reference voltage Vref to the charge amplifier and may provide any one voltage value determined as the reference voltage. As an example, the control unit 400 may provide an intermediate voltage between the driving voltage Vdd and the ground voltage Vgnd to the charge amplifier as Vref. As another example, the control unit 400 may provide different reference voltages in the first charge-sharing and the second charge-sharing process. For example, the ground voltage Vgnd may be provided as the reference voltage in the first charge-sharing phase P1, and the driving voltage Vdd may be provided to the charge amplifier 310 as the reference voltage Vref in the second charge-sharing phase P2.

The signal Vout generated through integration by the charge amplifier 310 is provided to the delay unit 320 (S200). The delay unit 320 maintains the provided signal Vout and outputs the maintained signal Vout when the charge amplifier 310 outputs the second touch signal VoutB.

Figure 7:
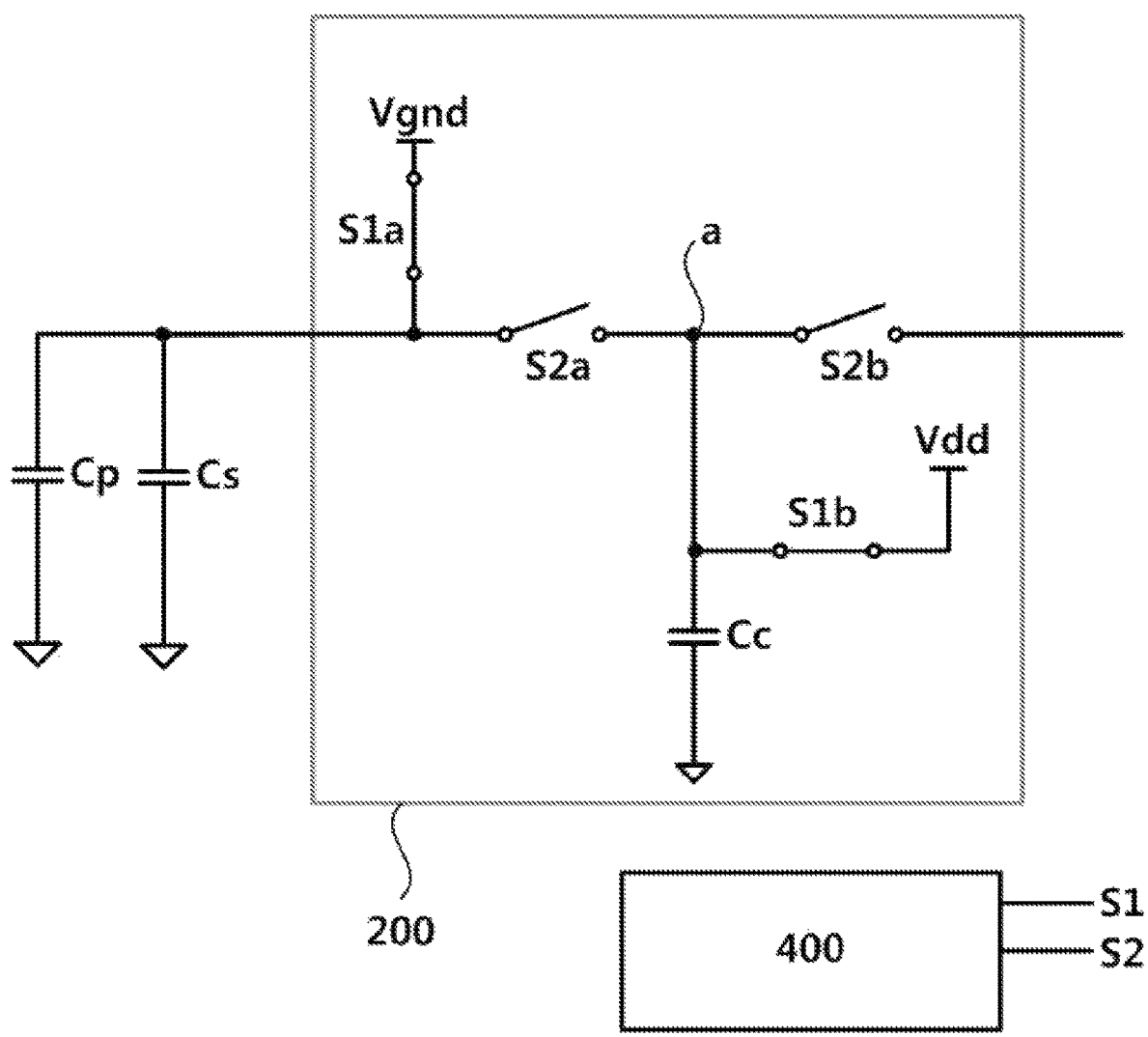
FIG. 7 is an equivalent circuit diagram in a precharge process of a second charge-sharing phase.

FIG. 7 is an equivalent circuit diagram in the precharge process pc of the second charge-sharing phase P2. Referring to FIG. 7, the control unit 400 provides the ground voltage Vgnd as the first voltage (see V1 in FIG. 1) and provides the driving voltage Vdd as the second voltage (see V2 in FIG. 1). Like in the first charge-sharing phase, the control unit 400 precharges the self-capacitor Cs and the parasitic capacitor Cp to the ground voltage Vgnd and precharges the charge-sharing capacitor Cc to the driving voltage Vdd by turning on the switches S1a and S1b, and resets the capacitor Cf by turning on the switch S1c.

Figure 8:
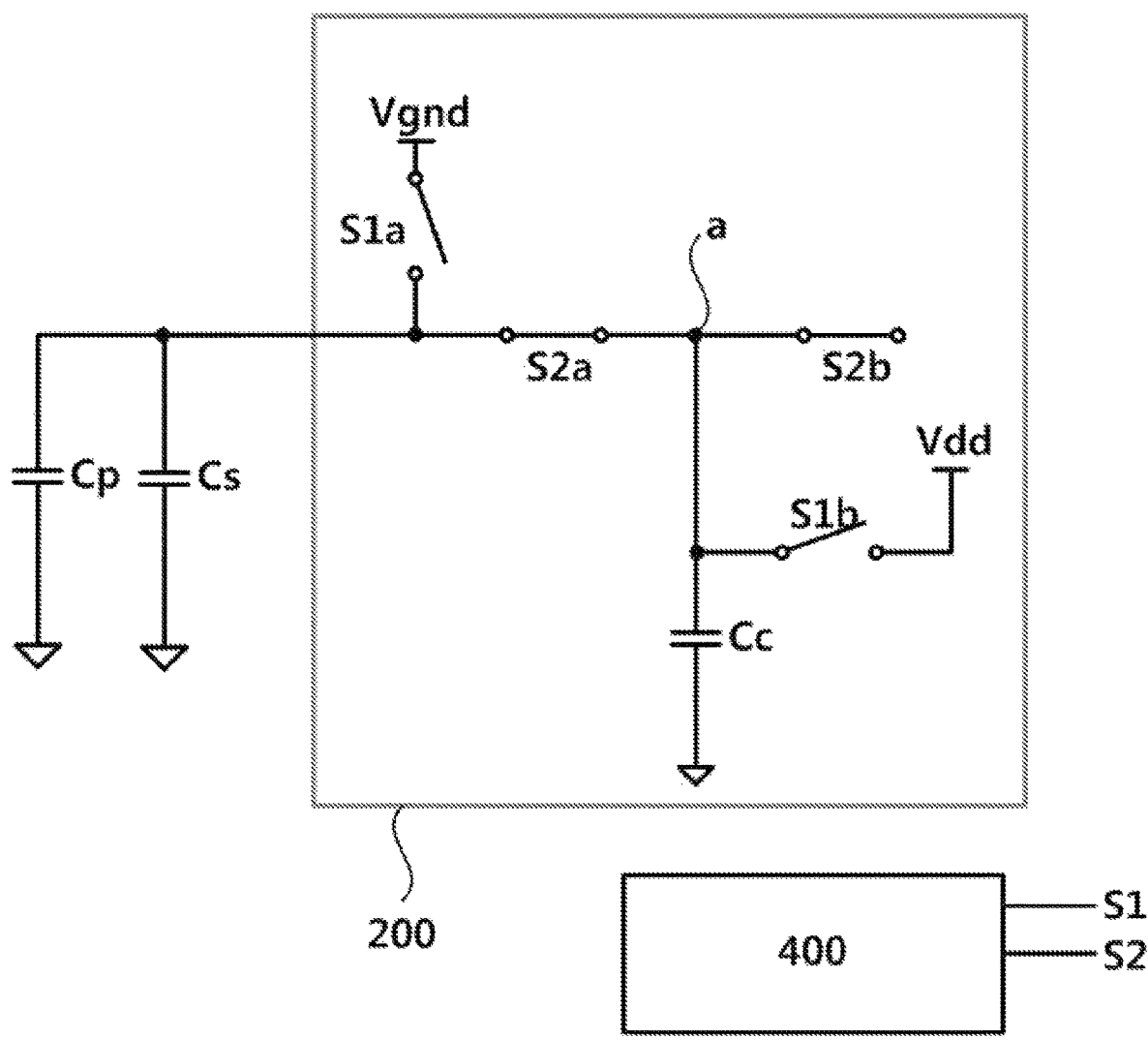
FIG. 8 is an equivalent circuit diagram in a charge-sharing process of the second charge-sharing phase.

FIG. 8 is an equivalent circuit diagram in the charge-sharing process cs of the second charge-sharing phase P2. The control unit 400 turns on the switch S2a by providing the control signal S2 of the logic-high state. The self-capacitor Cs and the parasitic capacitor Cp are electrically connected to the charge-sharing capacitor Cc, and charge sharing is performed. The switch S2b is turned on and outputs a voltage Va2 generated by the charge sharing. In the second charge-sharing phase P2, the voltage Va2 output by the charge-sharing unit 200 is as shown in the following equation.

$$Va2 = \frac{Vdd \times Cc}{(Cs + Cp + Cc)} \quad \text{[Equation 3]}$$

When Equation 2 and Equation 3 are compared with each other, the voltage Va1 generated in the first charge-sharing phase P1 has a product of the capacitances of the self-capacitor Cs and the parasitic capacitor Cp and the driving voltage value Vdd as a numerator, and the voltage Va2 generated in the second charge-sharing phase P2 has a product of the driving voltage value Vdd and the capacitance of the charge-sharing capacitor as a numerator. Therefore, it is possible to increase the difference between Va1 and Va2 by increasing the difference between the capacitance value of the self-capacitor Cs and the capacitance value of the charge-sharing capacitor Cc.

For example, it is assumed that the capacitance of the parasitic capacitor Cp in the panel is 10 times or more the capacitance of the charge-sharing capacitor Cc. In the first charge-sharing phase P1, the voltage value of the signal Va1 output by the charge-sharing unit 200 approximates to the value of the driving voltage Vdd as shown in the following equation.

$$Va1 = \frac{Vdd \times (Cs + Cp)}{(Cs + Cp + Cc)} = \frac{Vdd}{1 + \frac{Cc}{Cs + Cp}} \cong Vdd \quad \text{[Equation 4]}$$

Also, in the second charge-sharing phase P2, the signal Va2 output by the charge-sharing unit 200 is as shown in Equation 5 below.

$$Va2 = \frac{Vdd \times Cc}{(Cs + Cp + Cc)} \cong 0 \quad \text{[Equation 5]}$$

In other words, it is possible to see that the output signal Va1 generated in the first charge-sharing phase P1 and the output signal Va2 generated in the second charge-sharing phase P2 are complementary to each other.

A variation ΔQ1 of charge stored in the self-capacitor Cs in the first charge-sharing phase P1 is represented as a product of the capacitance Cs and a voltage variation ΔV1. The voltage variation ΔV1 is changed to the output signal Va1 of the first charge-sharing phase P1 after the self-capacitor is precharged to the driving voltage Vdd in the precharge process pc. Therefore, the voltage variation is as shown in Equation 6 below.

$$\Delta V1 = Va1 - Vdd = \frac{Vdd \times (Cs + Cp)}{(Cs + Cp + Cc)} - Vdd \quad \text{[Equation 6]}$$
$$= -\frac{Vdd \times Cc}{Cs + Cp + Cc}$$

A process of calculating the variation ΔQ1 of charge stored in the self-capacitor Cs with Equation 6 is as shown in Equation 7.

$$Q1 = Cs \times \Delta V1 = -\frac{Vdd \times Cs \times Cc}{(Cs + Cp + Cc)} \quad \text{[Equation 7]}$$

A variation ΔQ2 of charge stored in the self-capacitor Cs in the second charge-sharing phase P2 is represented as a product of the self-capacitance Cs and a voltage variation ΔV2. The voltage variation ΔV2 is changed to the output signal Va2 of the second charge-sharing phase P2 after the self-capacitor Cs is precharged to the ground voltage Vgnd in the precharge process pc. Therefore, the voltage variation is as shown in Equation 8 below.

$$\Delta V2 = Va2 - Vgnd = \frac{Vdd \times Cc}{(Cs + Cp + Cc)} \quad \text{[Equation 8]}$$

A process of calculating the variation ΔQ2 of charge stored in the self-capacitor Cs with Equation 8 is as shown in Equation 9.

$$Q2 = Cs \times \Delta V2 = \frac{Vdd \times Cs \times Cc}{(Cs + Cp + Cc)} \quad \text{[Equation 9]}$$

Looking at Equations 7 and 9, it is possible to see that the charge variations Q1 and Q2 caused by the self-capacitance are signals which have opposite signs and the same value, that is, which are complementary to each other. The charge amplifier 310 receives the voltage Va2 generated through second charge-sharing and outputs the second touch signal VoutB by amplifying the received voltage Va2.

The signals Vout and VoutB, which are received and amplified by the charge amplifier 310, are obtained by amplifying the signals Va1 and Va2, which are complementary to each other and output in the first and second charge-sharing phases, and thus are complementary to each other likewise. Therefore, the pair of output signals Vout and VoutB is a pair of pseudo differential signals.

According to an exemplary embodiment not shown in the drawings, the apparatus for detecting a touch further includes an ADC. The ADC receives the pair of pseudo differential signals Vout and VoutB output by the differential signal generation unit 300 and converts the pair of pseudo differential signals Vout and VoutB into digital signals.

FIG. 9A is a diagram showing an overview of values detected by an apparatus for detecting a touch according to conventional art, and FIG. 9B is a diagram showing an overview of values detected by an apparatus for detecting a touch according to the conventional art. Referring to FIG. 9A, touch values are detected by sensing a single sensing line at regular intervals according to the conventional art. However, when low-frequency noise (black solid lines) is introduced, noise offsets indicated by dotted lines interfere with detected touch values. Therefore, although a touch is consistently made, there is a fluctuation in detected touch values. Such a fluctuation causes an error in determining whether a touch has been made, a touch intensity, and touch coordinates.

On the contrary, according to an exemplary embodiment of the present invention, a pair of pseudo differential touch signals are generated through two charge-sharing phases, and thus only a difference value $V_{NOISE}$ between adjacent charge-sharing phases interferes with a touch value unlike the conventional art. Therefore, according to an exemplary embodiment of the present invention, even when noise of the same magnitude is introduced, only the difference value $V_{NOISE}$ between adjacent charge-sharing phases interferes with a touch value. Consequently, it is possible to reduce interfering noise in comparison with the conventional art, and the amount of interfering noise can be reduced by reducing the interval between charge-sharing phases.

The present invention has been described with reference to the embodiments shown in the drawings to help understanding of the present invention. However, the embodiments are merely examples for implementation, and those of ordinary skill in the art would understand that various modifications and equivalents can be made from the embodiments. Therefore, the technical scope of the present invention should be defined by the following claims.

The invention claimed is:

1. A method of generating pseudo differential touch signals, the method comprising:
generating a first touch signal corresponding to a touch input;
maintaining the generated first touch signal; and
generating a second touch signal corresponding to the touch input,
wherein the first touch signal and the second touch signal are in a pseudo differential relationship,
wherein the generation of the first touch signal includes:
  precharging parallel capacitors to a first voltage, wherein the parallel capacitors comprise a self-capacitor and a parasitic capacitor of a touch panel connected in a parallel manner, and wherein the self-capacitor is formed between an object which provides an input to the touch panel and an electrode of the touch panel;
  precharging a charge-sharing capacitor to a second voltage; and
  performing charge sharing by connecting the parallel capacitors to the charge-sharing capacitor,
wherein the generation of the second touch signal includes:
  precharging the parallel capacitors to the second voltage;
  precharging the charge-sharing capacitor to the first voltage; and
  performing charge sharing by connecting the parallel capacitors to the charge-sharing capacitor, and
wherein the first voltage and the second voltage have levels complementary to each other.

2. The method of claim 1, wherein the generation of the first touch signal and the generation of the second touch signal are performed at a time interval.

3. The method of claim 1, wherein the maintaining of the generation of the first touch signal and the generation of the second touch signal are simultaneously performed.

4. A method of detecting a touch, the method comprising:
generating a first touch signal corresponding to a touch input;
maintaining the generated first touch signal; and
generating a second touch signal corresponding to the touch input,
wherein the first touch signal and the second touch signal are in a pseudo differential relationship,
wherein the generation of the first touch signal includes:
  precharging parallel capacitors to a first voltage, wherein the parallel capacitors comprise a self-capacitor and a parasitic capacitor of a touch panel connected in a parallel manner, and wherein the self-capacitor is formed between an object which provides an input to the touch panel and an electrode of the touch panel;
  precharging a charge-sharing capacitor to a second voltage; and
  performing charge sharing by connecting the parallel capacitors to the charge-sharing capacitor,
wherein the generation of the second touch signal includes:
  precharging the parallel capacitors to the second voltage;
  precharging the charge-sharing capacitor to the first voltage; and
  performing charge sharing by connecting the parallel capacitors to the charge-sharing capacitor, and
wherein the first voltage and the second voltage have levels complementary to each other.

5. The method of claim 4, wherein the generation of the first touch signal and the generation of the second touch signal are performed at a time interval.

6. The method of claim 4, wherein the generation of the first touch signal further includes integrating a signal provided by the charge-sharing capacitor after the charge sharing and outputting the integrated signal.

7. The method of claim 4, wherein the generation of the second touch signal further includes integrating a signal provided by the charge-sharing capacitor after the charge sharing and outputting the integrated signal.

8. The method of claim 4, wherein the maintaining of the generation of the first touch signal and the generation of the second touch signal are simultaneously performed.

9. An apparatus for detecting a touch, the apparatus comprising:
- a touch panel configured to include an electrode constituting a self-capacitor together with an object, wherein the object provides an input to the touch panel;
- a charge-sharing unit configured to include a charge-sharing capacitor which is charge-shared with the self-capacitor;
- a differential signal generation unit configured to receive an output signal of the charge-sharing unit and generate a pair of pseudo differential touch signals; and
- a control unit configured to control the charge-sharing unit so that the charge-sharing unit performs charge sharing and outputting of the output signal,
- wherein the charge-sharing unit is controlled by the control unit to perform the charge sharing by precharging parallel capacitors to a first voltage, the parallel capacitors comprising the self-capacitor and a parasitic capacitor of the touch panel connected in a parallel manner, precharging the parallel capacitors to a first voltage, precharging the charge-sharing capacitor to a second voltage, electrically connecting the parallel capacitors to the charge-sharing capacitor for first charge sharing, precharging the parallel capacitors to the second voltage, precharging the charge-sharing capacitor to the first voltage, and electrically connecting the parallel capacitors to the charge-sharing capacitor for second charge sharing,
- wherein the first voltage and the second voltage have levels complementary to each other, and
- wherein the charge-sharing unit, the differential signal generating unit, and the control unit are each implemented via at least one processor.

10. The apparatus of claim 9, wherein the pair of pseudo differential touch signals include:
- a signal generated by sampling a voltage provided by the charge-sharing capacitor through the first charge sharing and maintaining the sampled voltage; and
- a signal generated by a voltage provided by the charge-sharing capacitor through the second charge sharing.

11. The apparatus of claim 9, wherein the differential signal generation unit includes:
- a charge amplifier configured to integrate the signal provided by the charge-sharing unit; and
- a delay unit configured to sample and hold an output signal of the charge amplifier.

* * * * *